United States Patent
Bradenbaugh (12) 
(10) Patent No.: US 6,374,046 B1
(45) Date of Patent: Apr. 16, 2002

(54) PROPORTIONAL BAND TEMPERATURE CONTROL FOR MULTIPLE HEATING ELEMENTS

(76) Inventor: Kenneth A. Bradenbaugh, 935 Woods Loop Dr., Weddington, NC (US) 28173-0310

( * ) Notice: Subject to any disclaimer, the term of this patent is extended or adjusted under 35 U.S.C. 154(b) by 0 days.

(21) Appl. No.: 09/361,825

(22) Filed: Jul. 27, 1999

(51) Int. Cl.[7] .............................. F24H 9/20; H05B 1/02
(52) U.S. Cl. ........................ 392/463; 219/492; 392/451
(58) Field of Search .............................. 219/482, 483, 219/486, 490, 492; 392/451, 454, 463

(56) References Cited

U.S. PATENT DOCUMENTS

| | | | |
|---|---|---|---|
| 3,586,830 A | 6/1971 | Leitner et al. | 219/501 |
| 3,637,984 A | 1/1972 | Irvine | 219/471 |
| 4,039,928 A | 8/1977 | Noftsker et al. | 323/19 |
| 4,046,991 A | 9/1977 | Sefton et al. | 219/497 |
| 4,053,733 A | 10/1977 | Murata et al. | 219/494 |
| 4,088,871 A | 5/1978 | Coulmance et al. | 219/497 |
| 4,111,443 A | 9/1978 | Sullivan et al. | 219/497 |
| 4,166,944 A | 9/1979 | Scott | 219/334 |
| 4,167,663 A | 9/1979 | Granzow, Jr. et al. | 219/497 |
| 4,223,207 A | 9/1980 | Chow | 219/494 |
| 4,337,388 A | 6/1982 | July | 219/309 |
| 4,362,924 A | 12/1982 | Story et al. | 219/497 |
| 4,449,032 A | 5/1984 | Frerking | 219/210 |
| 4,467,178 A | 8/1984 | Swindle | 219/330 |
| 4,467,182 A | 8/1984 | Merkel | 219/497 |
| 4,495,402 A | 1/1985 | Burdick et al. | 219/214 |
| 4,777,350 A | 10/1988 | Crockett et al. | 219/497 |
| 4,832,259 A | 5/1989 | VanderMeyden | 236/20 R |
| 4,834,284 A | 5/1989 | VanderMeyden | 236/20 R |
| 4,845,342 A | 7/1989 | Chen | 219/501 |
| 4,859,834 A | 8/1989 | Hausler et al. | 219/497 |
| 4,894,520 A | 1/1990 | Moran | 219/497 |
| 4,900,900 A | 2/1990 | Shirae et al. | 219/501 |
| 4,906,820 A | 3/1990 | Haarmann et al. | 219/497 |
| 4,950,872 A | 8/1990 | Chen | 219/499 |
| 4,978,838 A | 12/1990 | Sanjuan | 219/497 |
| 5,006,695 A | 4/1991 | Elliott | 219/494 |
| 5,019,690 A | 5/1991 | Knepler | 219/400 |
| 5,025,134 A | 6/1991 | Bensoussan et al. | 219/494 |
| 5,079,784 A | 1/1992 | Rist et al. | 4/542 |
| 5,090,305 A | 2/1992 | Lehman | 99/330 |
| 5,168,545 A | 12/1992 | Hart | 392/449 |
| 5,293,446 A | 3/1994 | Owens et al. | 392/449 |
| 5,305,418 A | 4/1994 | Tuttle | 392/449 |
| 5,361,729 A | * 11/1994 | Trihey | 122/17 |
| 5,367,602 A | 11/1994 | Stewart | 392/308 |
| 5,582,755 A | 12/1996 | Maher, Jr. et al. | 219/492 |
| 5,588,088 A | 12/1996 | Flaman | 392/449 |
| 5,679,275 A | 10/1997 | Spraggins et al. | 219/505 |
| 5,831,250 A | 11/1998 | Bradenbaugh | 219/497 |
| 5,866,880 A | * 2/1999 | Seitz et al. | 219/483 |
| 5,948,304 A | * 9/1999 | Bradenbaugh | 219/496 |
| 6,242,720 B1 | 6/2001 | Wilson et al. | |

* cited by examiner

Primary Examiner—Teresa Walberg
Assistant Examiner—Thor Campbell
(74) Attorney, Agent, or Firm—Michael Best & Friedrich LLP (57) ABSTRACT

A water heater having a water tank and multiple electric resistance heating elements extending into the water tank for heating water in the tank. The water heater includes a proportional band temperature controller for conducting electric power to the electric resistance heating elements in bursts. Each burst of electric power is followed by a period during which the temperature controller does not conduct power to the electric resistance heating element. In one embodiment, each burst of electrical power lasts for about 95% or less of a cycle comprised of one burst of electric power followed by the period during which the temperature controller does not conduct electric power. Further, activation of the heating elements by the controller is carried out in a sequential or other timed or controlled fashion to permit uniform heating of the water in the tank. Further, the controller may operate a cold water introduction valve to further enhance temperature uniformity in the tank.

16 Claims, 5 Drawing Sheets

PROPORTIONAL BAND TEMPERATURE CONTROL FOR MULTIPLE HEATING ELEMENTS

FIELD OF THE INVENTION

The present invention relates generally to electrically heated water heaters. Particularly, the invention relates to improved methods and apparatus for heating water in such water heaters. More particularly, the invention relates to methods and apparatus for pulsing electrical power to an electrical resistance heating element in a manner to improve the heating efficiency of the heating element in a water heater.

The description herein is in terms of domestic water heaters in which the water is heated with electrical resistance heating elements. The description, as well as the improvements of the present invention, apply generally to water heaters which employ electrical resistance heating elements.

BACKGROUND OF THE INVENTION

A hot water heater, as contemplated herein, typically comprises a permanently enclosed vertically mounted cylindrical water tank, a cylindrical shell coaxial with and radially spaced apart from the water tank to form an annular space between the outer wall of the water tank and the inner wall of the shell, and insulating material in at least a portion of the annular space for providing thermal insulation to the water tank. Polymer foam expanded directly within the annular space is an effective insulating material. Particularly, polyol and isocryanate reactants with foaming agents are commonly reacted in place within the annular space to form polyurethane foam which readily expands to fill the available space and rapidly cures into a hard, closed cell foam insulating material. Means, such as foam dams, are provided for containing the expanding foam within the annular space.

The water tank has various appurtenances such as inlet, outlet and drain fittings. Especially, the water tank is provided with water heating and temperature control means. Typically for electrically heated water heaters, the water heating means comprises an electrical resistance heating element. The heating element extends through a fitting in the wall of the water tank such that the resistance heating element is inside the tank and means for connecting the resistance heating element to an electrical power source is outside the water tank.

Temperature control means for an electrically heated water heater commonly comprise a mechanical thermostat which operates a switch to allow electrical power through the electrical resistance heating element when water in the tank is sensed to be below a selected set point temperature, and operates the switch to stop electrical power from passing through the electrical resistance heating element when the water in the tank is at or above the set point temperature. With such temperature control means, electrical power through the electrical resistance heating element is either fully on, passing full electrical current, or completely off.

The mechanical thermostats commonly used for water heaters comprise a bimetallic disc of metal which is mounted in contact with the outer wall of the water tank, for sensing temperature of water in the water tank. The bimetallic disc, when cooler than the set point temperature, is flat. However, at the set point temperature, the bimetallic disc snaps into a convex dome shape which the disc maintains until it cools to a temperature below the set point. At a temperature below the set point, the bimetallic disc snaps back into a flat position. Mechanical hysteresis in the bimetallic disc causes the temperature at which the disc snaps back into flat position to be substantially lower, (5 to 10° C.), than the set point temperature at which the bimetallic disc snaps into a convex dome shape. The bimetallic disc is connected, by an electrically insulated push rod, to an electrical switch in a phenolic resin housing which is attached to the outer wall of the water tank. The electrical switch is in an electric line connecting the electrical resistance heating element to a source of electric power.

A threaded stud is mounted in the housing in contact with the bimetallic disc for manual adjustment of tension on the bimetallic disc such that the bimetallic disc may be adjusted to snap from flat position to convex dome position at the desired set point temperature.

When the bimetallic disc senses a cool water temperature, and the disc is in a flat position, the push rod closes the electrical switch, allowing electrical power to flow through the electrical resistance heating element, thus heating water in the water tank. As the water heats, the bimetallic disc snaps into a convex dome shape at the set point temperature and the push rod opens the electrical switch, shutting off power to the electrical resistance heating element. The electrical switch remains open, and the power cut off, until water in the tank cools enough for the bimetallic disc to snap into a flat position, thus closing the electrical switch and allowing electrical power to flow into the electrical resistance heater. The electrical power is either on at full capacity or completely off.

Due to variations in manufacture and hysteresis of the bimetallic disc, the temperature at which the disc will snap from a flat position to a convex dome position can vary by as much as 25° F. (14° C.). Tension may be applied to the bimetallic disc with the threaded stud for adjusting the set point temperature at which the bimetallic disc will snap from a flat position to a convex domed position. The threaded stud is not calibrated, and adjustments of tension to achieve action of the bimetallic disc at a selected set point temperature are made by trial and error. Often a mechanical temperature control, employing a bimetallic disc thermocouple, will "overshoot" the desired set point temperature, allowing the electrical resistance heating element to continue heating water in the water tank above the desired set point temperature.

The mechanical temperature control means, described above, and the electrical resistance heating element are in contact with the outer wall of the water tank and extend into the annular space between the water tank outer wall and the shell. These items must be accessible for servicing. One or more openings in the wall of the shell provide access to the temperature control means and the electrical resistance heating element. A dam structure is provided around each opening for protecting the temperature control means and electrical resistance heating element from contact with the insulating foam and to prevent the foam from escaping the annular space via the openings in the shell wall.

Electrically heated water heaters are provided with safety devices. A high temperature safety shut off switch is installed in the electric power line which cuts off power to the electrical resistance heating element when the temperature in the water tank rises above a safe level. Also, the water tank is provided with a high temperature relief valve which is set to open at about the water boiling point, (100° C.), for preventing an increase of pressure in the water tank from boiling water.

SUMMARY OF THE INVENTION

According to the present invention, electric power to an electrical resistance heating element of a water heater is modulated, by providing the electric power in short pulses or bursts, over a substantial portion of the water heating cycle. Modulating the electric power improves the efficiency of heating water in the water heater. Providing electric power to the resistance heating element of a water heater in short pulses or bursts allows an equal amount of water to be heated to a selected temperature at substantially the same rate as with a mechanical temperature controller of the prior art, yet uses substantially less electric power to heat the water. The electric hot water heater used to heat and store water in a typical residential installation is often the largest single electric energy-consuming appliance. Thus using substantially less electric power to heat water provides significant energy and cost savings.

A preferable way for modulating electric power in short bursts to the resistance heating element is by use of a proportional band temperature controller. A proportional band temperature controller is an electronic device which senses temperature of water in the tank of a water heater and controls electric power to the resistance heating element at a rate depending upon the differential separation of the water temperature from a selected set point temperature. The proportional band temperature controller modulates electric power to the electric resistance heating element by providing electric power in cycles, each cycle comprising conducting electric power in a short burst followed by a short period with no conduction of electric power. When the differential separation between the temperature of the water in the water tank and the set point temperature is large, the period during which electric power is conducted in each cycle is long compared to the period during which electric power is not conducted. As the water temperature approaches the selected set point temperature, the period during which electric power is conducted to the resistance heating element in each cycle grows shorter. The period for each cycle may be adjusted and typically is less than one second. Also, typically, the period of each electrical burst during a cycle is reduced from about 95% to about 50% of the cycle period as the water temperature approaches the set point temperature.

When the water temperature reaches the set point temperature, the proportional band temperature controller completely stops conducting electric power to the resistance heating element. Then, when the water temperature falls below the set point temperature, the proportional band temperature controller again conducts electric power to the resistance heating element in cycles of short bursts.

Proportional band temperature controllers are efficient, having very small electrical power losses, and accurately stop conducting electric power when the water temperature reaches the set point temperature. Additionally, proportional band temperature controllers are less expensive to manufacture and install, compared to the mechanical temperature controllers of the prior art. Also, addons, such as indication lamps, audible alarms, and temperature displays, can readily be connected to proportional band temperature controllers for improving operation and convenience of the water heaters to which they are connected.

Other features and advantages of the invention will become apparent to those skilled in the art upon review of the following detailed description, claims and drawings.

Before embodiments of the invention are explained in detail, it is to be understood that the invention is not limited in its application to the details of construction and the arrangement of components or steps set forth in the following description or illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENTS

As described above, the use of a proportional band temperature controller in a water heater having an electrical resistance heating element has the unexpected advantage of heating water in the water heater to a preselected set point temperature while consuming less electric power than is consumed when heating the same weight of water to the same set point temperature in the same water heater using a mechanical temperature controller of the prior art.

A proportional band temperature controller is an electronic device which comprises a water temperature sensing device (thermistor), a temperature set point device (variable rheostat), a gated thyristor for switching electric power to the resistance heating element, and a logic circuit for controlling the thyristor in response to signals from the water temperature sensing device and the temperature set point device. The logic circuit receives a voltage input from the water temperature sensing device and the temperature set point device which indicates the differential of the water temperature from the set point temperature. The logic circuit, in response to the voltage inputs from the water temperature sensing device and the temperature set point device, signals the gated thyristor. At large temperature differentials between the water temperature sensing device and the temperature set point device, the logic circuit signals the gated thyristor to conduct electricity during a major portion, about 94%, of each cycle of the AC current, and signals the gated thyristor to stop conducting electricity for about 6% of each AC cycle. As the temperature differential between the water and the set point narrows, the water temperature enters a proportional control band where the logic circuit begins to exert more control over the gated thyristor to limit electric power to the resistance heating element. As the water temperature enters the proportional control band, the logic circuit establishes a new control cycle period and signals the thyristor to conduct electric power for 85% of each cycle and to stop conducting for 15% of each cycle. As the water temperature gets closer to the set point temperature the logic circuit signals the thyristor to conduct for less of each cycle period. When the water temperature reaches the set point temperature, the logic circuit closes the thyristor and electric power is not supplied to the resistance heating element until the water temperature again falls below the set point temperature. To prevent undue cycling about the set point temperature, the logic circuit is set to require the water temperature to drop 5° C. to 10° C. below the set point temperature before the thyristor is again signaled to conduct electric power and heat the water back to the set point temperature.

This improvement in the efficiency of heating water in the water heater using a proportional band temperature controller is not completely understood. In theory, essentially all the electrical power supplied to a resistance heating element will be converted to heat, and that heat should be transferred to the water surrounding the resistance heating element. The same amount of electric power should heat the same weight of water the same number of degrees temperature. As shown in the example below, a water heater having a proportional band temperature controller requires about 10% less electrical power to heat a tank of water to a selected set point temperature than the same water heater having a mechanical temperature controller of the prior art. The improved accuracy of a proportional band temperature controller for bringing water to a set point temperature with little overshoot accounts for some of the improved efficiency over a mechanical temperature controller, but does not appear to account for all.

While not wishing to be bound, I suggest that the improvement in heating efficiency when using a proportional band temperature controller arises from physical conditions within the water tank affecting the transfer of heat from the resistance heating element to the water. A proportional band temperature controller conducts electric power to the resistance heating element in short bursts followed by short periods during which electric power is not conducted until the water in the water tank reaches a selected set point temperature. The proportional band temperature controller accurately stops conducting electric power to the resistance heating element when the water reaches the set point temperature. On the other hand, a mechanical temperature controller of the prior art conducts electric power to the resistance heating element continuously at full power as the water is heating. When the water reaches the set point temperature mechanical characteristics of the bimetallic thermocouple may cause the mechanical temperature controller to overshoot and heat the water to a temperature above the set point temperature before it stops conducting electric power to the resistance heating element.

A resistance heating element, as is used in domestic water heaters, heats in a few seconds to a temperature in the range of 800° F. to 900° F. Water, in contact with such a hot resistance heating element, vaporizes, to form a layer of steam around the resistance heating element and reducing the transfer of heat from the resistance heating element to the water. With a mechanical temperature controller, the resistance heating element is so heated and remains at a high temperature until the bimetallic thermocouple cuts off electric power. Excess heat from a resistance heating element controlled by a mechanical temperature controller may be radiated to the wall of the water tank, or may be transported by steam to the top of the water tank where the excess heat is absorbed in the topmost layer of water which is located away from the temperature sensing bimetallic thermocouple.

With a proportional band temperature controller, the resistance heating element is heated during each burst of electric power and is cooled by contact with the water during periods between bursts. This cooling of the resistance heating element between each burst of electric power reduces the temperature to which the resistance heating element is raised and reduces the accumulation of steam around the hot resistance heating element. Consequently, heat transfer from the resistance heating element to the water is increased. Supplying electric power to a resistance heating element in a water heater in discrete short bursts, each burst followed by a period with the electric power shut off, improves the efficiency of heat transfer from the resistance heating element to the water in the water heater.

Proportional band temperature controllers are well known and widely used in many commercial applications, including to control water temperature in such appliances as coffee makers. Proportional band temperature controllers have not, to my knowledge, been used to control the temperature of a large volume of water in a water heater.

Figure 1:
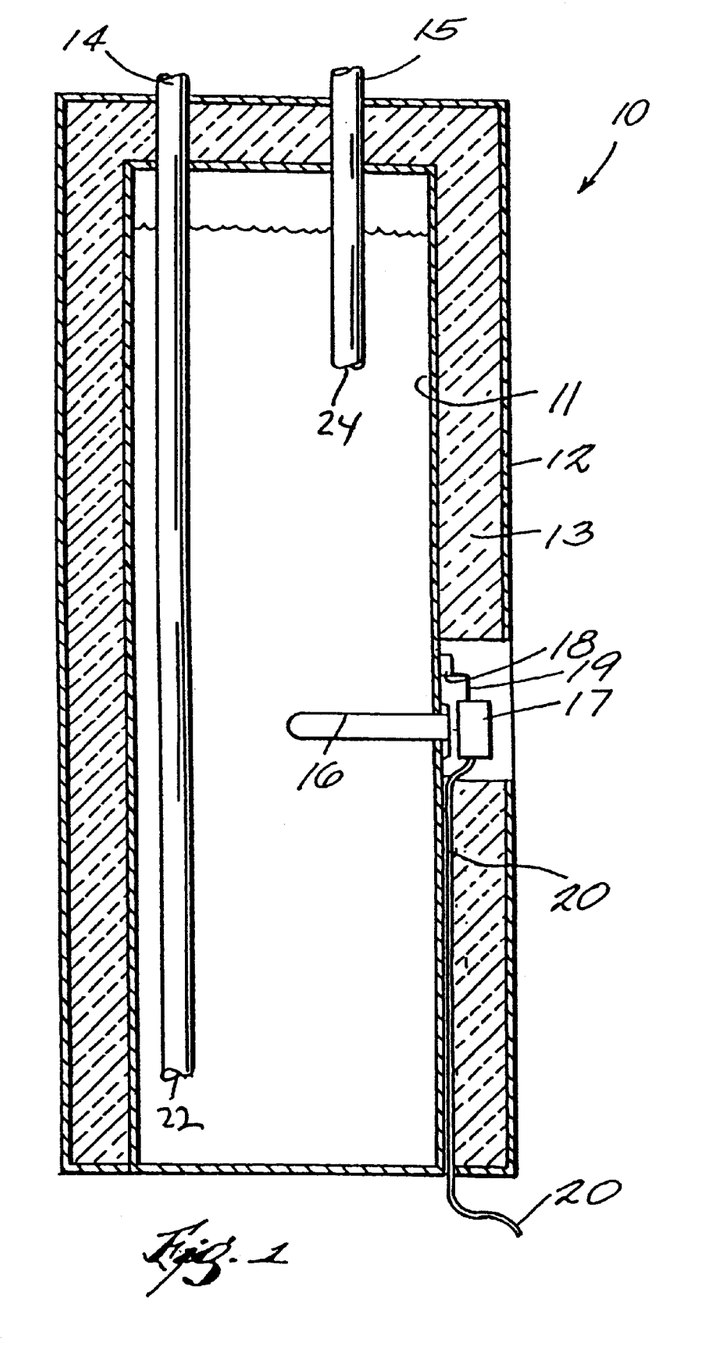
FIG. 1 is a sectional view of a water heater, showing the arrangement of the temperature controller of the present invention in relation to other components of the water heater.

FIG. 1 of the drawing shows a sectional view of a water heater 10 comprising a permanently enclosed water tank 11, a shell 12 surrounding water tank 11, and foam insulation 13 filling the annular space between water tank 11 and shell 12. Water inlet line or dip tube 14 enters the top of water tank 11 for adding cold water near the bottom of water tank 11. Water outlet line 15 exits water tank 11 for withdrawing hot water from near the top of water tank 11. Resistance heating element 16 extends through the wall of water tank 11. The proportional band control circuitry in control box 17 is connected to resistance heating element 16. Thermistor 18, in contact with the outer wall of water tank 11 for sensing the temperature of water in water tank 11, is connected to the logic circuit by electrical wire 19. Electric A.C. power is supplied to the gated thyristor through line 20. A customizable operator interface may be mounted on the outside of the water heater to permit communication with the control box 17 and provides security protected access for control of the heating element. The operator interface may be operable to provide direct or remote control of the heating element.

Figure 2:
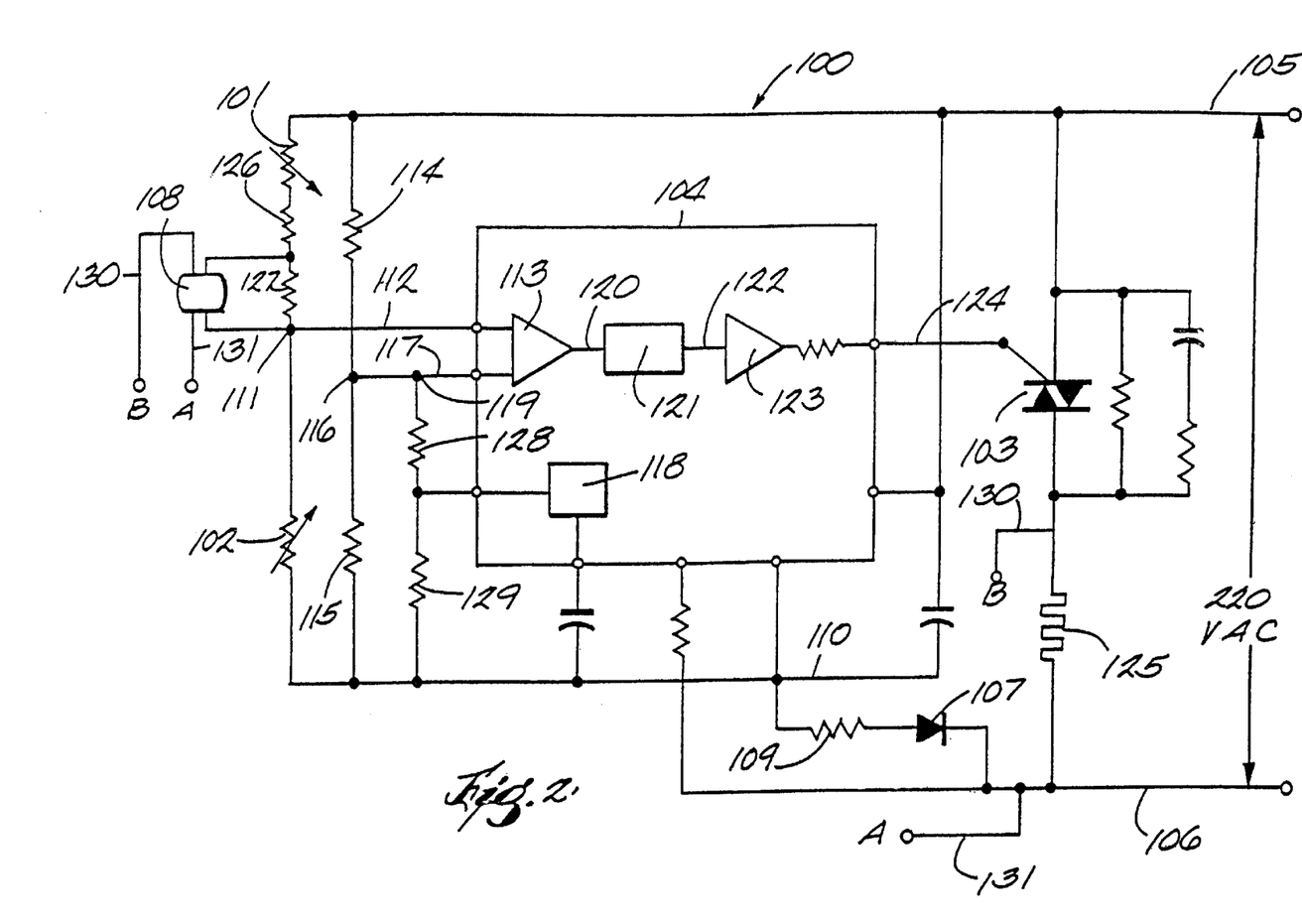
FIG. 2 is an electrical schematic of the preferred temperature controller of the present invention.

FIG. 2 of the drawings is a schematic drawing of a preferred proportional band temperature control circuit 100 for heating water in a water heater according to the method of the present invention. In FIG. 2, resistance heating element 125 is a 4,500 watt heating element for heating water in a water heater. Temperature set point device 101 is a variable rheostat for setting the temperature set point in the range of about 90° F. to 180° F. Thermistor 102 is for sensing temperature of water in the water heater. In an alternative embodiment, a plurality of thermistors could be placed through the tank to measure water temperature at a plurality of locations. The output of the thermistors could be averaged.

Gated thyristor 103 is a TRIAC, manufactured by Motorola, Inc., for controlling electric power to resistance heating element 125. Logic chip 104 is a proportional band temperature controller UAA1016A manufactured by Motorola, Inc. Two hundred forty volt electric power is supplied to the proportional band temperature control circuit 100 through lines 105 and 106. Opto-electric coupler 108, as will be described below, is for controlling the amount the water temperature must decrease from the set point temperature before the proportional band temperature control circuit will reactivate.

A stabilized supply voltage of about −8 Volts is delivered to the proportional band temperature control circuit from line 106 through Zener diode 107 and resistor 109 into line 110. Voltage drops through temperature set point device 101 and temperature sensor 102 produce a signal voltage at point 111. The signal voltage is proportional to the temperature difference between the set point temperature and the sensed water temperature. The sensed voltage is transmitted via line 112 to one leg of a voltage comparator 113 within logic chip 104. A reference voltage, the magnitude of which is determined by voltage drops through resistors 114 and 115, is generated at point 116. A saw tooth voltage, generated in saw tooth generator 118 in logic chip 104, is imposed upon the reference voltage at point 119. The reference voltage, modified by the saw tooth voltage passes via line 117 to the second leg of voltage comparator 113.

The saw tooth voltage imposed upon the reference voltage causes the voltage at the second leg of voltage comparator 113 to vary, in a saw tooth pattern, over a cycle of about 0.85 seconds from a minimum to a maximum voltage. In voltage comparator 113, the signal voltage at the first leg is compared to the modified reference voltage at the second leg. The comparison result is transmitted via line 120 to logic circuit 121. In logic circuit 121, a signal is generated for passing via line 122, amplifier 123 and line 124 for controlling thyristor 103. When the signal voltage at the first leg of comparator 113 is greater than the maximum value of the reference voltage at the second leg of comparator 113, the signal to thyristor 103 is to conduct and allow electric power to flow through resistance heating element 125 for heating water in the water tank. Logic chip 104 is arranged such that the signal in line 124 causes thyristor 103 to conduct electricity for 96% of each AC current cycle and stop conducting for 4% of each current cycle.

The signal voltage at the first leg of voltage comparator 113 will fall to a value less than the maximum value of the reference voltage at the second leg of voltage comparator 113 as the water temperature sensed by temperature sensor 102 approaches the set point temperature selected on set point temperature device 101. When the signal voltage is in the range between the maximum value of the reference voltage and the average of the reference voltage value, the temperature control circuit 100 is within the proportional band control range. Thus, when the signal voltage is greater than the value of the reference voltage at the second leg of the voltage comparator, logic circuit 121 signals amplifier 123 to signal thyristor 103 to conduct electric power to resistance heating element 125. Then, as the saw tooth voltage causes the reference voltage at the second leg of voltage comparator to increase to a value greater than the value of the signal voltage at the first leg of the voltage comparator, logic circuit 121 signals amplifier 123 to signal thyristor 103 to stop conducting electric power to resistance heating element 125. the average value of the reference voltage at the second leg of voltage comparator 113, thyristor 103 is not conducting for greater percentages of each cycle of the generated saw tooth voltage. When the water temperature sensed by temperature sensor 102 is equal to the set point temperature of temperature set point device 101 the signal voltage at the first leg of voltage comparator 113 will equal the average reference voltage value at the second leg of voltage comparator 113 and logic circuit 121 signals amplifier 123 to turn off thyristor 103, shutting off electric power to resistance heating element 125. Thyristor 103 remains in the non-conducting state until the water temperature sensed by temperature sensor 102 falls below the set point temperature by a preset amount, as is described below.

The signal voltage at the first leg of voltage comparator 113 and the reference voltage at the second leg of voltage comparator 113 must have values which allow logic circuit 121 to produce a signal to amplifier 123 which will properly control thyristor 103 to heat the water to the desired temperature. Temperature set point device 101 is a variable rheostat the resistance of which may be adjusted manually for changing the set point temperature. Temperature sensor 102 is a thermistor in which the resistance decreases as the sensed temperature of the water increases. The values of resistors 126 and 127 are selected such that the signal voltage at point 111 will be proportional to the difference between the set point temperature and the sensed water temperature. The reference voltage at point 116 is determined by the value of resistors 114 and 115, and the magnitude of the saw tooth voltage imposed upon the reference voltage at point 119 is determined by the values of resistors 128 and 129. The values for these resistors must be adjusted to accommodate the characteristics of the particular temperature set point device 101, temperature sensor 102 and logic chip 104 selected for the proportional band temperature control circuit 100.

As described above, opto-electric coupler 108 is included in proportional band temperature control circuit 100 to prevent undue cycling of thyristor 103 when the sensed water temperature is at about the set point temperature. When the sensed water temperature equals the set point temperature, logic circuit 121 signals amplifier 123 to cut off thyristor 103 and stop conduction of electric power to resistance heating element 125. Without opto-coupler 108, when the sensed water temperature drops a small amount, for example, less than 1° C., below the set point temperature, logic circuit 121 will signal amplifier 123 to open thyristor 103 and conduct electric power to resistance heating element 125 until the sensed water temperature is again heated to the set point temperature. This action results in rapidly turning thyristor 103 off and on, to control the sensed water temperature as closely as possible to the set point temperature.

Opto-electric coupler 108, connected electrically across resistance heating element 125 by lines 130 and 131, operates to make the sensed temperature appear to be about 5° C. higher than it actually is when electric current is flowing through resistance heating element 125. So, when the water temperature sensed by temperature sensor 102 reaches the set point temperature, thyristor 103 is stopped from conducting electric current through resistance heating element 125 and optoelectric coupler 108. With no current flowing through opto-electric coupler 108, the signal voltage at point 111 is determined by voltage drop through temperature sensor 102 and voltage drop through set point device 101, resistor 126, and resistor 127. Resistor 127 produces a voltage drop equivalent to the voltage drop caused by about a 5° C. temperature change in the sensed temperature. Consequently, the sensed temperature appears to be about 5° C. higher than it actually is, and the sensed temperature must drop an additional 5° C. before the signal voltage at the first leg of voltage comparator 113 will indicate that the sensed temperature is below the set point temperature. When voltage comparator 113 signals logic circuit 121 that the sensed temperature is below the set point temperature, logic circuit 121 signals amplifier 123 to open thyristor 103 and allow electric current to flow through resistance heating element 125. With electric current flowing through resistance heating element 125, electric current flows through opto-electric coupler 108 via lines 130 and 131. With electric current flowing through opto-electric coupler 108, resistor 127 is bypassed and the 5° C. bias to the apparent sensed water temperature is removed. Logic circuit 121 then signals amplifier 123 to open thyristor 103 until the sensed water temperature again reaches the set point temperature. This action of opto-electric coupler 108 allows the sensed temperature to fall about 5° C. below the set point temperature before thyristor 103 again conducts electric power through resistance heating element 125, and allows the sensed water temperature to be heated to the set point temperature before electric power is cut off from resistance heating element 125. This action prevents cycling of electric current through resistance heating element 125 when the sensed water temperature is at about the set point temperature.

In an alternative embodiment, the temperature control circuit 100 could include a programmable real time clock wherein peak or off-peak energy demand periods or vacation operation cycles could be programmed into the control cycle for the heating element. Additionally, a pressure sensor, temperature sensor, mineral deposit sensor and/or sensor for detecting the presence of water could be added. The control circuit would be programmed to disconnect power from the water heater and/or the heating element when predetermined conditions or limits are detected. Further, the control circuit could include means for automatically adjusting the set point in response to various conditions such as amount of water used, or whether it is a peak or off-peak energy demand period.

EXAMPLE

In a first example, an electric water heater having a 4,500 Watt resistance heating element was operated for heating water from 60° F. to 120° F. using 240 Volt AC current. In a first run, a commercially available bimetallic thermostat, as described in the introduction to this application, was used to sense the water temperature and control electric current to the resistance heating element. In a second run, the proportional band temperature control circuit, as shown in FIG. 2 and described in this application, was used to sense the water temperature and control flow of electric current to the resistance heating element. Results of the two comparative runs are shown in FIG. 3 of the drawings.

For Run 1, tension on a bimetallic thermostat was adjusted with a threaded stud such that the bimetallic thermostat would snap from a flat configuration to a domed configuration at a set point temperature of 120° F. The bimetallic thermostat was placed in contact with the outer wall of the water heater water tank at a position about three inches above the electric resistance heating element. The bimetallic thermostat was connected, via an insulating rod, to an electric switch in a line supplying electric power to the resistance heating element. The water tank was filled with 60° F. water and the electric power connected to the line supplying the resistance heating element. The bimetallic thermostat remained in a flat position and the electric switch was closed. Electric current passed through the resistance heating element at a rate of 19.7 amperes for about 27 minutes until the water was heated to about 122° F. The bimetallic thermostat then snapped into a domed shape, activating the switch to cut off electric current to the resistance heating element. A graph of water temperature versus time for this first run is shown in FIG. 3.

For Run 2, a proportional band temperature control circuit, as shown in FIG. 2 and described above in this application, was used. The temperature set point device 101 was calibrated for a set point of 120° F., and the thermistor temperature sensing device 102 was attached to the water tank about three inches above the resistance heating element 125. Thyristor 103 was connected to resistance heating element 125. The water tank of the water heater was drained and refilled with 60° F. water and the proportional band temperature control circuit 100 was connected to the electric power main. The proportional band temperature control circuit 100 initially supplied 18.8 amperes of electricity to the resistance heating element 125, i.e. about 95% of the amperes supplied by the mechanical thermostat of Run 1. After about four minutes (at 68° F.), the proportional band temperature control circuit 100 reduced the electricity supplied to resistance heating element 125 to 18.6 amperes, i.e. about 91% of the amperes supplied by the mechanical thermostat of Run 1. After about 21 minutes (at 104° F.), the sensed water temperature entered the proportional band temperature range and the proportional band temperature control circuit 100 began to slowly reduce electric current to resistance heating element 125, until after 27 minutes the sensed water temperature reached the set point temperature and the proportional band temperature circuit 100 shut off electric current to the resistance heating element 125.

Figure 3:
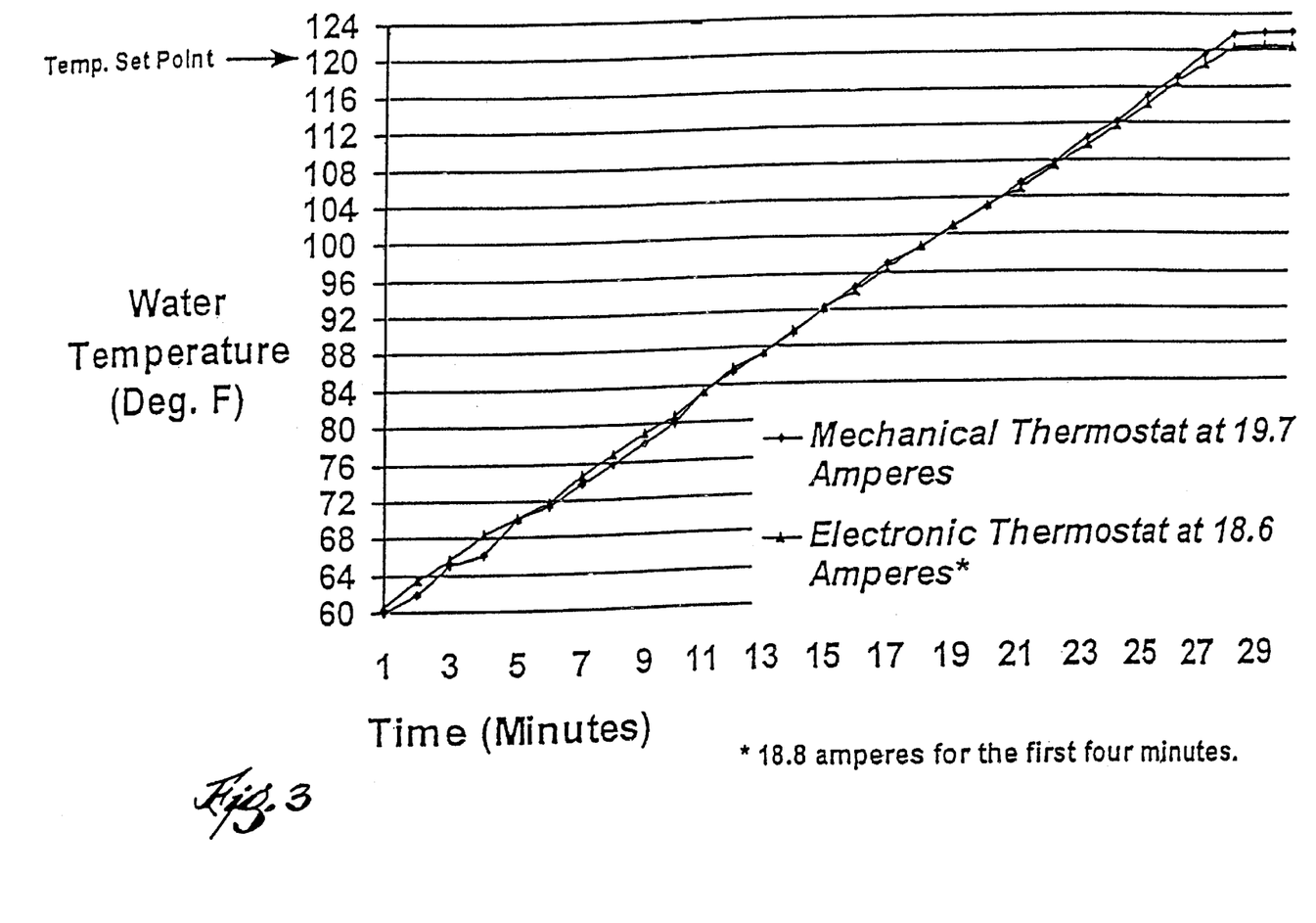
FIG. 3 is a plot of energy usage data of a mechanical temperature controller of the prior art and a proportional band temperature controller of the present invention.

Inspection of FIG. 3 shows that the same amount of water was heated to substantially the same temperature in the same amount of time in Run 1 and Run 2. However, in Run 1, 19.7 amperes of electricity were required and in Run 2, only about 18.6 amperes of electricity were required over the heating period. That is, heating water in a water heater equipped with the proportional band temperature control circuit of the present invention, which supplies electricity to the resistance heating element 125 in short bursts followed by short periods with electricity shut off, requires about 9% less electric power than heating the same amount of water to the same temperature in the same water heater, but using a mechanical temperature controller. This is an unexpected result.

The pulsing of current to the load by the proportional band temperature control circuit permits the water temperature to minutely rise and fall rapidly in response to the applied current. A brief interruption of current applied to the heater element each cycle allows for a more efficient transfer of radiation energy to the water from the heater element.

Figure 4:
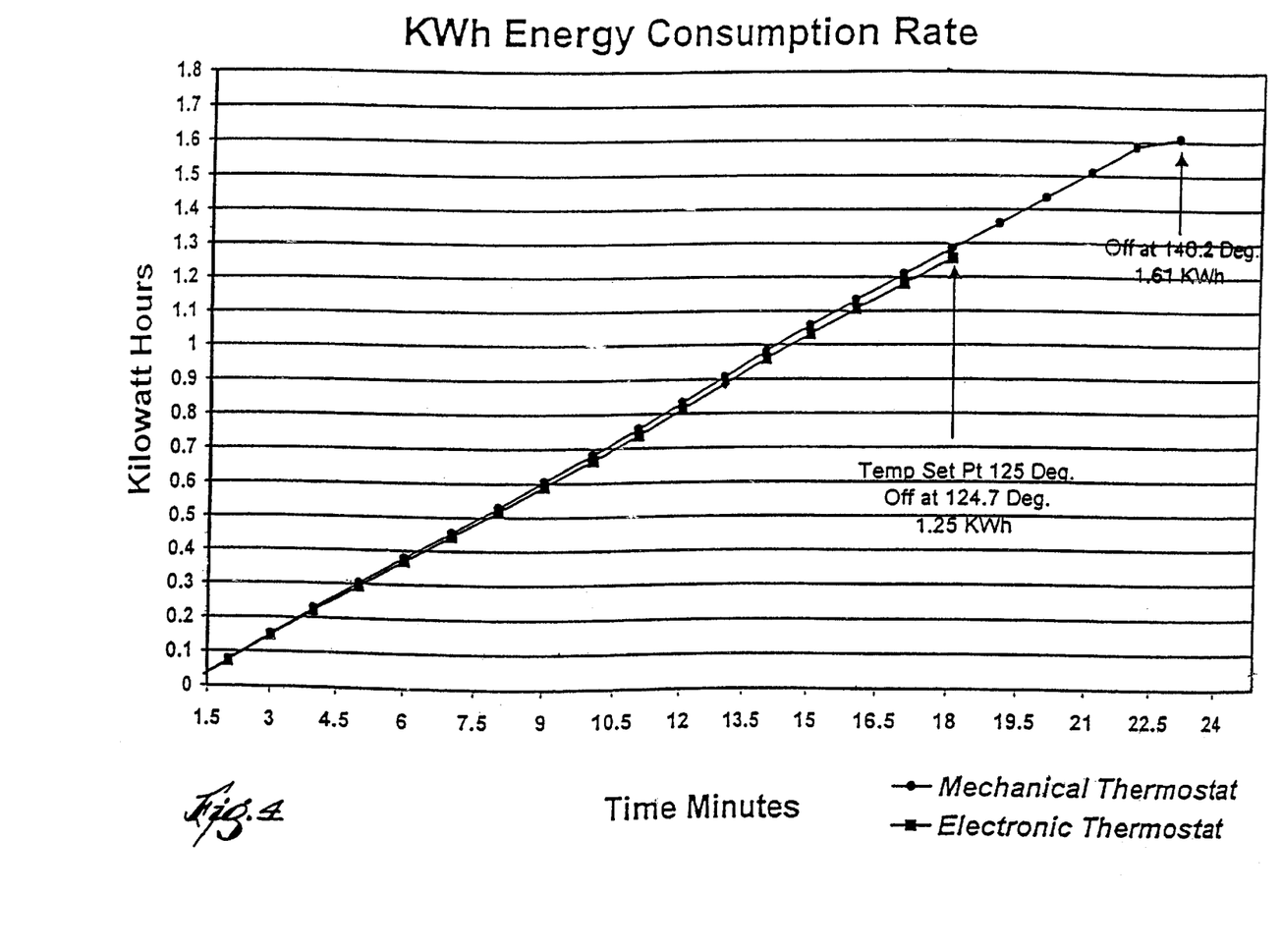
FIG. 4 is a plot of energy consumption rate data of the mechanical temperature controller of the prior art and the proportional band temperature controller of the present invention.

As a second example, a test was performed to determine the actual amount of energy a consumer would use during a typical hot water heater operating cycle. Referring to FIG. 4, the actual kilowatt hours (kWh) is plotted versus time for a mechanical thermostat and an electronic thermostat including proportional band control logic.

FIG. 4 illustrates that during a typical heating cycle, approximately 3% less energy is being used as a direct result of using the proportional band control logic. It is possible that this percentage could be increased to approximately 5–5.5% by changing the conduction angle of the triac's firing quadrants, without adversely affecting the performance of the water heater.

Additionally, by limiting the current to the heater element using proportional band control logic and by supplying the current to the heater in pulses, gradually coasting to the temperature set point without overshooting the desired temperature offers an additional 15% energy reduction.

The combination of current modulation and preventing the overshooting of the temperature set points offers the consumer a combined energy savings of nearly 20% over the cost of operation of a similar heater using a bimetal mechanical thermostat.

Overheating water past a reasonable temperature of 125° F.–130° F. generally wastes energy. A typical two inch thick layer of insulation loses its capacity to effectively retain heat at temperatures above 130° F. or so. This energy loss in standby mode is wasteful and potentially causes the heater to cycle more often than necessary.

The proportional band control circuit of the present invention prevents overshooting and allows the water temperature to drop only 5° F. or so to cycle only the needed difference to return the water temperature to a desired setpoint.

An additional advantage to the proportional band control circuit is its suitability for a flammable vapor environment.

For example, such an environment may exist in a garage, workshop, or basement storage area wherein solvents, gasoline, propane or other highly flammable or explosive vapors are present. Mechanical thermostats and contact type switching devices can arc when an electrical contact is made or broken, depending on the amount of current being switched. The electrical arc can ignite a flammable vapor if the vapor is sufficiently volatile. In contrast, the proportional band control circuit is totally solid state, has no moving parts, and would not ignite flammable vapors.

Figure 5:
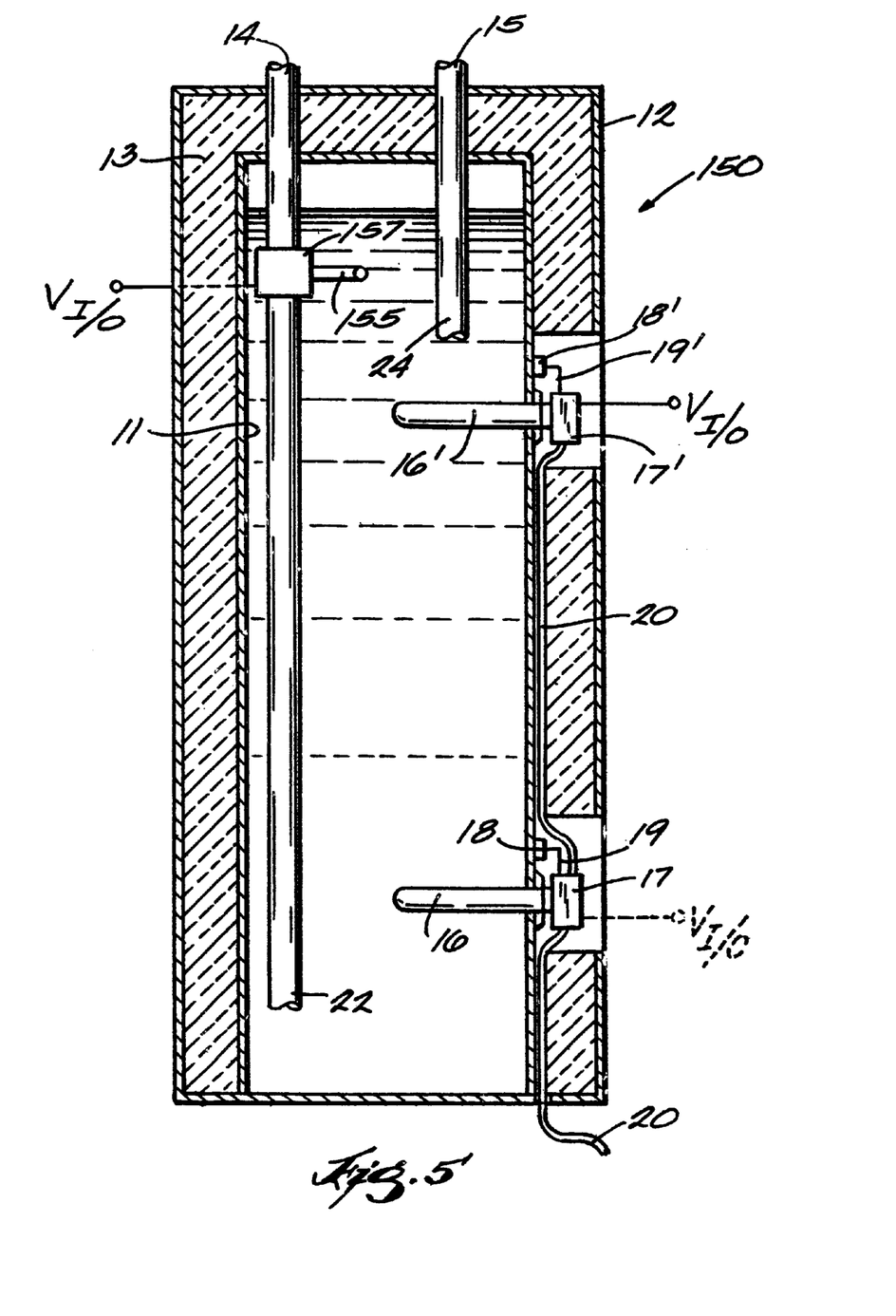
FIG. 5 is a sectional view of a water heater with multiple heating elements in accordance with another embodiment of the present invention.

While implementing proportional band control as described above is advantageous, even greater heating efficiency can be achieved in a water heater with multiple, controlled heating elements. An exemplary water heater 150 with such elements is shown in FIG. 5. The water heater 150 shares many common elements with the water heater 10, and common elements are designated with the same reference numerals in FIGS. 1 and 5. However, unlike the water heater 10, the water heater 150 has multiple heating elements 16 and 16'. Heating element 16 is located in the lower portion of the tank and heating element 16' is located in the upper portion of the tank. The heating element 16' may be controlled by control circuitry stored in a control box 17' which receives input from a thermistor or temperature sensor 18' through a communication link 19', such as an electrical wire. Alternatively, although not shown, the sensor 18' and heating element 16' could communicate with control circuitry stored in the control box 17 and just one controller rather than multiple circuits could be employed. Communication between the sensor 18' and heating element 16' could be accomplished through a communication link (not shown) running physically parallel to line 20. In the case of controlling two heating elements with a single controller, the control circuitry in box 17 might take the form of a programmable microprocessor. Of course, more than two heating elements could be installed in the water heater 150 and controlled by such a controller, if desired.

Regardless of the exact control circuitry used, or whether a single controller or multiple controllers are implemented, the heating elements in FIG. 5 are activated sequentially or at some predetermined frequency or fashion so that heat energy being transferred to the tank 11 is distributed in a balanced or uniform manner. Thus, for example, the heating element 16 might be active for a first period of time T1 during which power is supplied to it in the pulsed or multiple-burst manner described above. Subsequently, the element 16' might be activated in a pulsed manner for a period of time T2. Times T1 and T2 may or may not be of equivalent lengths, and may or may not overlap one another depending on the specific heating application and conditions. Moreover, feedback mechanisms employing the temperature sensors 18 and 18' may be used to trigger activation of the specific heating elements depending upon the temperature sensed in the upper and lower portions of the tank 11.

Whatever specific sequencing is employed, the use of a proportional band temperature controller to control multiple elements in a water heater helps to avoid uneven heating of the water in the tank. Uneven heating generally occurs in conventional heating systems where the bulk of water heating is accomplished with a heating element positioned near the bottom of the heater tank. This configuration often results in the creation of "stacking," where water that is heated rises to the top of the tank and becomes super-heated, while non-uniform temperature strata are formed in the lower portion of the tank. To make matters worse, the heat accumulation at the top of the tank tends to rapidly dissipate because the insulation 13 in the tank cannot effectively retain the high energy heat from the super heated water. With sequential pulse or burst heating of water as described herein, water in the tank 11 is more uniformly heated. This reduces the occurrence of hot or cold spots in the strata from the top to the bottom of the tank. The creation of super heated water is also reduced and efficiency is increased.

The sequencing described above may also be combined with controlled introduction of cold water through an outlet or conduit 155 of a mixing valve 157 positioned in the dip tube 14. The valve 157 may be controlled through a communication link $V_{I/O}$ coupled to the control circuitry in box 17' or, alternatively (and not shown), the circuitry in box 17 when it is configured to control multiple heating elements. Thus, for example, if super heating is sensed by the sensor 18' in the upper portion of the tank, an amount of cold water may be introduced into the top portion of the tank 11 through the outlet 155 to lower the temperature of the heated water.

While particular embodiments of the invention have been shown and described herein, changes and modifications may be made without departing from the spirit and scope of the invention. For example, logic chips other than the Motorola UAA1016A logic chip may be used to control the on-off cycle of thyristor 103. Also, a temperature sensing device other than the thermistor used as temperature sensing device 102 may be employed. Also, a thyristor other than a Motorola TRIAC may be used as thyristor 103 and multiple heating elements and other alternative control circuits, as noted above, may be utilized. Therefore, no limitation of the invention is intended other than limitations contained in the appended claims.

What is claimed is:

1. A storage-type water heater comprising:
    a tank for holding water so that the water can be heated to a selected hot-water temperature during periods of non-use;
    an inlet for adding cold water to the tank;
    an outlet for withdrawing heated water from the tank;
    a first heating element extending into the tank;
    a second heating element extending into the tank;
    a control circuit for controlling the supply of electric power to the first and second heating elements in bursts, each burst followed by a period during which electric power is not supplied to the heating elements, the control circuit operable to activate the first heating element for a first period of time and to activate the second heating element for a second period of time.

2. A water heater as in claim 1 further comprising a valve positioned in the inlet, the valve having an outlet conduit and controlled by the control circuit to introduce cold water into the water tank through the outlet conduit.

3. A water heater as in claim 1, wherein the second heating element is positioned below the first heating element and the first and second heating elements are activated in a sequential manner.

4. For a storage-type water heater comprising a water tank for storing water during periods of non-use, and first and second electric resistance heating elements extending into the water tank for heating the water to a selected hot-water temperature, a method for heating water in the water tank from an initial cool temperature to the selected hot-water temperature, the method comprising:
    storing water in the water tank so that the water can be heated to the selected hot-water temperature during periods of non use;
    conducting electric power to the first electric resistance heating element in bursts, each burst of electric power followed by a period during which electric power is not conducted through the first electric resistance heating element; and conducting electric power to the second electric resistance heating element in bursts, each burst of electric power followed by a period during which electric power is not conducted through the second electric resistance heating element.

5. A method as in claim 4, wherein electricity supplied to the first and second electrical resistance heating elements is alternating current;

wherein the period of each burst of electric power is a fraction of each cycle of alternating current; and wherein the period following each burst of electric power, during which electric power is not conducted through the first and second electrical resistance heating elements, comprises the remaining fraction of each cycle of alternating current.

6. A method as in claim 2, wherein the period of each burst of electric power is about 95% or less of each cycle of alternating current.

7. A storage-type water heater comprising:

a water tank that stores water while the water is being heated to a set point hot-water temperature;

a water inlet line for adding cold water to the water tank;

a water outlet line for withdrawing heated water from the water tank;

first and second electric resistance heating elements extending into the water tank; and a proportional band temperature control circuit for conducting alternating current electric power to the first and second electric resistance heating elements, and modulating the electric power so that only a proportionally decreasing portion of the electric power is supplied to the first and second electric resistance heating elements as the water approaches the set point hot-water temperature.

8. A water heater as in claim 7, wherein the tank has a top and a bottom, and wherein the water inlet line includes a dip tube extending into the tank at a point adjacent the top of the tank and having an outlet adjacent the bottom of the tank.

9. A water heater as in claim 8 wherein the dip tube includes a valve positioned in the dip tube, wherein the valve has an outlet conduit and is controlled by the control circuit to introduce cold water into the water tank through the outlet conduit.

10. A water heater as in claim 7, wherein the water outlet line has an inlet adjacent the top of the tank.

11. A water heater as in claim 7, and further comprising a shell surrounding the tank to define a space between the tank and the shell, and insulation within the space.

12. A water heater as in claim 7, wherein the control circuit limits the portion of the waveform to less than about 96% of each cycle.

13. A water heater as in claim 7, wherein the control circuit includes a set point temperature device for establishing the set point temperature to which the control circuit will heat the water in the water tank, a temperature sensor which senses a sensed temperature of the water in the water tank, and a logic circuit for determining the temperature differential between the sensed water temperature and the set point temperature and for stopping conduction of power to the electric resistance heating elements when the sensed temperature is at or above the set point temperature.

14. A water heater as in claim 13, wherein the control circuit includes means for preventing undue cycling of the logic circuit, such that when the sensed temperature reaches the set point temperature, the conduction of power to the electric resistance heating elements is stopped until the sensed temperature falls below the set point temperature by a predetermined amount.

15. A water heater as in claim 14, wherein the means for preventing undue cycling includes an opto-electric coupler.

16. A water heater as in claim 14, wherein the means for preventing undue cycling operates to make the sensed temperature appear to the logic circuit to be greater than it is by the predetermined amount.

* * * * *